United States Patent
Vilja et al.

(10) Patent No.: US 12,297,393 B2
(45) Date of Patent: May 13, 2025

(54) METHOD FOR PRODUCING RENEWABLE FUELS

(71) Applicant: Neste Oyj, Espoo (FI)

(72) Inventors: Jesse Vilja, Espoo (FI); Markku Kuronen, Espoo (FI); Jenni Nortio, Espoo (FI)

(73) Assignee: NESTE OYJ, Espoo (FI)

( * ) Notice: Subject to any disclaimer, the term of this patent is extended or adjusted under 35 U.S.C. 154(b) by 254 days.

(21) Appl. No.: 17/776,831

(22) PCT Filed: Nov. 13, 2020

(86) PCT No.: PCT/FI2020/050754
§ 371 (c)(1),
(2) Date: May 13, 2022

(87) PCT Pub. No.: WO2021/094655
PCT Pub. Date: May 20, 2021

(65) Prior Publication Data
US 2022/0403252 A1    Dec. 22, 2022

(30) Foreign Application Priority Data

Nov. 15, 2019   (WO) .................. PCT/FI2019/050817

(51) Int. Cl.
*C10G 45/58*    (2006.01)
*C10G 3/00*    (2006.01)
(Continued)

(52) U.S. Cl.
CPC ............... *C10G 45/58* (2013.01); *C10G 3/46* (2013.01); *C10G 3/50* (2013.01); *C10G 3/60* (2013.01);
(Continued)

(58) Field of Classification Search
CPC ............ C10G 45/58; C10G 3/46; C10G 3/50; C10G 3/60; C10G 7/00; C10G 67/02;
(Continued)

(56) References Cited

U.S. PATENT DOCUMENTS

| 8,039,682 B2 | 10/2011 | Mccall et al. |
| 8,058,492 B2 | 11/2011 | Anumakonda et al. |

(Continued)

FOREIGN PATENT DOCUMENTS

| BR | PI0908586 A2 | 9/2015 |
| BR | 112019014621 A2 | 4/2020 |

(Continued)

OTHER PUBLICATIONS

International Search Report (PCT/ISA/210) and Written Opinion (PCT/ISA/237) mailed on Feb. 11, 2021, by the Finnish Patent and Registration Office as the International Searching Authority for International Application No. PCT/FI2020/050754. (20 pages).

(Continued)

*Primary Examiner* — Ali Z Fadhel
(74) *Attorney, Agent, or Firm* — Buchanan Ingersoll & Rooney PC

(57) ABSTRACT

The present disclosure provides a diesel fuel component produced from feedstock of biological origin and a method for producing the same. The present disclosure provides diesel fuel blends containing the diesel fuel component of biological origin and at least one additional diesel fuel.

8 Claims, 2 Drawing Sheets

(51) Int. Cl.
*C10G 7/00* (2006.01)
*C10G 67/02* (2006.01)
*C10L 1/08* (2006.01)
*C10M 109/02* (2006.01)

(52) U.S. Cl.
CPC .............. *C10G 7/00* (2013.01); *C10G 67/02* (2013.01); *C10L 1/08* (2013.01); *C10M 109/02* (2013.01); *C10G 2300/1011* (2013.01); *C10G 2300/1014* (2013.01); *C10G 2300/1018* (2013.01); *C10G 2300/202* (2013.01); *C10G 2300/205* (2013.01); *C10G 2300/207* (2013.01); *C10G 2300/208* (2013.01); *C10G 2300/302* (2013.01); *C10G 2300/304* (2013.01); *C10G 2300/307* (2013.01); *C10G 2300/308* (2013.01); *C10G 2300/4006* (2013.01); *C10G 2300/4012* (2013.01); *C10G 2300/4081* (2013.01); *C10G 2300/80* (2013.01); *C10G 2400/04* (2013.01); *C10G 2400/08* (2013.01); *C10G 2400/10* (2013.01); *C10L 2200/0469* (2013.01); *C10L 2270/026* (2013.01); *C10L 2270/04* (2013.01); *C10M 2203/003* (2013.01)

(58) Field of Classification Search
CPC .... C10G 2300/1011; C10G 2300/1014; C10G 2300/1018; C10G 2300/202; C10G 2300/205; C10G 2300/207; C10G 2300/208; C10G 2300/302; C10G 2300/304; C10G 2300/307; C10G 2300/308; C10G 2300/4006; C10G 2300/4012; C10G 2300/4081; C10G 2300/80; C10G 2400/04; C10G 2400/08; C10G 2400/10; C10G 65/043; C10G 3/00; C10L 1/08; C10L 2200/0469; C10L 2270/026; C10L 2270/04; C10M 109/02; C10M 2203/003; H01B 3/22; Y02E 50/10; Y02P 30/00; Y02P 30/20; Y02T 50/678

See application file for complete search history.

(56) References Cited

U.S. PATENT DOCUMENTS

| | | |
|---|---|---|
| 8,927,795 B2 | 1/2015 | Mccall et al. |
| 9,321,970 B2 | 4/2016 | Dupassieux et al. |
| 9,458,396 B2 | 10/2016 | Weiss et al. |
| 9,469,583 B2 | 10/2016 | Hakola et al. |
| 9,914,880 B2 | 3/2018 | Fichtl et al. |
| 10,131,848 B2 | 11/2018 | Aalto et al. |
| 10,246,658 B2 | 4/2019 | Abhari et al. |
| 10,351,781 B2 | 7/2019 | Sinha et al. |
| 10,640,721 B2 | 5/2020 | Sandberg et al. |
| 10,954,459 B2 | 3/2021 | Kuronen et al. |
| 11,001,774 B2 | 5/2021 | Abhari et al. |
| 11,236,280 B2 | 2/2022 | Abhari et al. |
| 11,306,265 B2 | 4/2022 | Kuronen et al. |
| 11,459,510 B2 | 10/2022 | Iversen et al. |
| 2009/0250376 A1 | 10/2009 | Brandvold et al. |
| 2009/0283442 A1 | 11/2009 | Mccall et al. |
| 2009/0287029 A1* | 11/2009 | Anumakonda ........ C10G 45/64 585/16 |
| 2009/0294324 A1 | 12/2009 | Brandvold et al. |
| 2009/0301930 A1 | 12/2009 | Brandvold et al. |
| 2011/0232169 A1 | 9/2011 | Cherrillo et al. |
| 2013/0116490 A1 | 5/2013 | Dupassieux et al. |
| 2013/0305591 A1* | 11/2013 | McCall ..................... C10L 1/08 585/240 |
| 2014/0291200 A1 | 10/2014 | Weiss et al. |
| 2015/0011784 A1 | 1/2015 | Aoki et al. |
| 2015/0018581 A1 | 1/2015 | Kettunen et al. |
| 2015/0094506 A1 | 4/2015 | Fichtl et al. |
| 2015/0191404 A1 | 7/2015 | Aalto et al. |
| 2016/0289568 A1 | 10/2016 | Dutta et al. |
| 2017/0009144 A1 | 1/2017 | Aalto et al. |
| 2017/0158966 A1 | 6/2017 | Fichtl et al. |
| 2017/0165655 A1 | 6/2017 | Sinha et al. |
| 2017/0183593 A1 | 6/2017 | Sandberg et al. |
| 2017/0327757 A1 | 11/2017 | Abhari et al. |
| 2018/0148656 A1 | 5/2018 | Laurent et al. |
| 2018/0216021 A1 | 8/2018 | Kuronen et al. |
| 2019/0276758 A1 | 9/2019 | Abhari et al. |
| 2019/0382666 A1 | 12/2019 | Wiklund |
| 2020/0048522 A1 | 2/2020 | Doucet et al. |
| 2020/0270544 A1 | 8/2020 | Plancq |
| 2021/0163835 A1 | 6/2021 | Kuronen et al. |
| 2021/0261875 A1 | 8/2021 | Abhari et al. |
| 2022/0033717 A1 | 2/2022 | Kiiski et al. |
| 2022/0081626 A1 | 3/2022 | Myllyoja et al. |
| 2022/0177791 A1 | 6/2022 | Kuronen et al. |
| 2022/0184581 A1 | 6/2022 | Singh et al. |
| 2022/0396739 A1 | 12/2022 | Nortio et al. |
| 2022/0411699 A1 | 12/2022 | Rantasalo et al. |
| 2022/0411702 A1 | 12/2022 | Sarjovaara et al. |
| 2023/0137687 A1 | 5/2023 | Jadaun et al. |

FOREIGN PATENT DOCUMENTS

| | | |
|---|---|---|
| CN | 102027096 A | 4/2011 |
| CN | 102027097 A | 4/2011 |
| CN | 102124080 A | 7/2011 |
| CN | 103122253 A | 5/2013 |
| EP | 1741768 A1 | 1/2007 |
| EP | 1956070 A1 | 8/2008 |
| EP | 2141217 A1 | 1/2010 |
| EP | 1963461 B1 | 5/2018 |
| EP | 3352177 A1 | 7/2018 |
| FI | 960525 A | 8/1997 |
| GB | 692427 A | 6/1953 |
| JP | 2011526640 A | 10/2011 |
| WO | 2009151690 A2 | 12/2009 |
| WO | 2009151692 A2 | 12/2009 |
| WO | 2013115137 A1 | 8/2013 |
| WO | 2014128227 A1 | 8/2014 |
| WO | 2015101837 A2 | 7/2015 |
| WO | 2015142887 A1 | 9/2015 |
| WO | 2018078021 A1 | 5/2018 |
| WO | 2018138412 A1 | 8/2018 |
| WO | 2018139971 A1 | 8/2018 |
| WO | 2018234189 A1 | 12/2018 |
| WO | 2019002679 A1 | 1/2019 |
| WO | 2019092379 A2 | 5/2019 |
| WO | 2020109653 A1 | 6/2020 |
| WO | 2021013860 A1 | 1/2021 |
| WO | 2021094655 A1 | 5/2021 |
| WO | 2021094657 A1 | 5/2021 |
| WO | 2021094658 A1 | 5/2021 |

OTHER PUBLICATIONS

International Search Report (PCT/ISA/210) and Written Opinion (PCT/ISA/237) mailed on Feb. 17, 2021, by the European Patent Office as the International Searching Authority for International Application No. PCT/FI2020/050756. (11 pages).

International Search Report (PCT/ISA/210) and Written Opinion (PCT/ISA/237) mailed on Feb. 18, 2021, by the Finnish Patent and Registration Office as the International Searching Authority for International Application No. PCT/FI2020/050757. (15 pages).

International Search Report (PCT/ISA/210) and Written Opinion (PCT/ISA/237) mailed on Feb. 15, 2021, by the Finnish Patent and Registration Office as the International Searching Authority for International Application No. PCT/FI2020/050758. (19 pages).

International Search Report (PCT/ISA/210) mailed on Feb. 19, 2020, by the European Patent Office as the International Searching Authority for International Application No. PCT/FI2019/050817. (12 pages).

(56) References Cited

OTHER PUBLICATIONS

Written Opinion of the International Preliminary Examining Authority (PCT/IPEA/408) issued in corresponding International Patent Application No. PCT/FI2020/050754 dated Jan. 13, 2022. (15 pages).
Written Opinion of the International Preliminary Examining Authority (PCT/IPEA/408) issued in corresponding International Patent Application No. PCT/FI2020/050757 dated Dec. 16, 2021. (11 pages).
Written Opinion of the International Preliminary Examining Authority (PCT/IPEA/408) issued in corresponding International Patent Application No. PCT/FI2020/050758 dated Jan. 12, 2022. (15 pages).
International Preliminary Report on Patentability (PCT/IPEA/409) issued in corresponding International Patent Application No. PCT/FI2020/050754 dated Mar. 4, 2022. (37 pages).
International Preliminary Report on Patentability (PCT/IPEA/409) issued in corresponding International Patent Application No. PCT/FI2020/050757 dated Mar. 7, 2022. (29 pages).
International Preliminary Report on Patentability (PCT/IPEA/409) issued in corresponding International Patent Application No. PCT/FI2020/050758 dated Mar. 4, 2022. (41 pages).
Finnish Search Report issued in corresponding U.S. Appl. No. 20/185,965 dated Mar. 7, 2019. (2 pages).
Chevron, "Diesel Fuels Technical Review", 2007, pp. 1-107, Chevron Corporation. (116 pages).
Dijs, I. J., et al., "Quantitative determination by 14C analysis of the biological component in fuels", Radiocarbon, 2006, vol. 48, Nr. 3, pp. 315-323. (9 pages).
DNV GL, Using biodiesel in marine diesel engines: new fuels, new Challenges, Online Oct. 14, 2020 (retrieved on Jan. 29, 2021, online at www.dnvgl.com/news/using-biodiesel-in-marine-dieselengines-new-fuels-new-challenges-186705. (2 pages).
Neste Retail, Technical Data Sheet, Jun. 14, 2021, https://www.neste.fi/static/datasheet_pdf/150240_fi.pdg. (2 pages).
Ovaska, T. et al., Effects of alternative marine diesel fuels on the exhaust particle size distributions of an off-road diesel engine:, Applied Thermal Engineering, Jan. 28, 2019, vol. 150, pp. 1168-1176. (9 pages).
Repsol, Electra 3x Plus Industr, Lubricants-Technical data sheet; Aug. 1, 2016, XP055666025, retrieved from the Internet URL: https://www.repsol.com/imagenes/global/en/RP_ELECTRA_3X_PLUS_EN_tcml4-54907.pdf [retrieved on Feb. 6, 2020]. (2 pages).
Starck, L., et al., "Production of Hydroprocessed Esters and Fatty Acids (HEFA)—Optimisation of Process Yield", Oil & Gas Science and Technology Rev. IFP Energies nouvelles, Jun. 23, 2014, vol. 71, No. 1. (13 pages).
Office Action issued on Apr. 3, 2023, by the Brazilian Patent Office in corresponding Brazilian Application No. BR112022008202-9, and an English Translation of the Office Action. (14 pages).
Office Action issued on Mar. 14, 2024, by the U.S. Patent and Trademark Office in U.S. Appl. No. 17/776,931.
Mohd Noor et al., "Biodiesel as Alternative Fuel for Marine Diesel Engine Applications: A Review", Renewable and Sustainable Energy Reviews, Jun. 9, 2018, pp. 127-142, vol. 94, XP085453841.
The extended European Search Report issued on Dec. 15, 2023, by the European Patent Office in corresponding European Application No. 20886606.1. (9 pages).
The extended European Search Report issued on Dec. 15, 2023, by the European Patent Office in corresponding European Application No. 20886773.9. (10 pages).
Notification of the First Office Action issued on Mar. 11, 2023, by the Chinese Patent Office in corresponding Chinese Patent Application No. 202080078127.9, and an English Translation of the Office Action. (17 pages).
Office Action (Notice of Reasons for Refusal) issued on Jun. 13, 2023, by the Japanese Patent Office in corresponding Japanese Patent Application No. 2022-527229, and an English Translation of the Office Action. (11 pages).
Office Action issued on Oct. 10, 2024, by the U.S. Patent and Trademark Office in co-pending U.S. Appl. No. 17/776,902. (12 pages).
Office Action issued on Sep. 25, 2024, by the U.S. Patent and Trademark Office in co-pending U.S. Appl. No. 17/776,911. (30 pages).
Notice of Allowance issued on Feb. 27, 2025, by the U.S. Patent and Trademark Office in co-pending U.S. Appl. No. 17/776,911. (9 pages).
Office Action issued on Mar. 13, 2025, by the U.S. Patent and Trademark Office in co-pending U.S. Appl. No. 17/776,902. (13 pages).

\* cited by examiner

METHOD FOR PRODUCING RENEWABLE FUELS

FIELD OF THE INVENTION

The present invention relates to a method for combined production of essentially two paraffinic products suitable for use as fuels, and more particularly to the paraffinic products obtainable by the method. Especially, one of the products is aviation fuel of biological origin and the further paraffinic product is diesel fuel of biological origin.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Aviation fuels or jet fuels are traditionally manufactured from crude mineral oil, which is typically separated by means of distillation into straight run kerosene fraction boiling in the aviation fuel range, and if required, followed by optional conversion processes like cracking etc. well known in the art. Mineral oil derived kerosene meeting aviation fuel requirements may also be produced for example by hydroprocessing or by caustic washing of straight run kerosene. Currently aviation fuels are produced also from renewable feedstock i.e. feedstock of biological origin.

US2017327757 relates to renewable compositions suitable as a diesel fuel, a diesel fuel additive, an aviation fuel and an aviation fuel additive and to a method for producing the same. The method comprises hydrotreating feedstock of biological origin in a fixed bed hydrotreatment reactor and fractionating the hydrotreated product. The renewable fuels may be blended with petroleum based fuel and/or synthetic fuel.

EP2141217A1 relates to hydrocarbons of biological origin suitable as aviation fuels or jet fuels and as blending stocks for aviation fuels and to a process for producing the same. The process comprises hydrodeoxygenation of renewable feedstock followed by isomerization, separating fractions and recycling the fraction boiling at a temperature above 200° C. to re-isomerization.

There is a growing end user demand for sustainable, bio-originating and possibly recycled alternatives in the field of aviation fuels and diesel fuels. Although not yet mandated to contain bio-originating products, there are clear signs of legislative directives emerging also for these areas. Currently, there is limited offering of bio-originating alternatives available for the above-mentioned applications. Further, the bio-originating alternatives are typically not cost competitive with the conventional offering, which has limited the development of the bio-originating and recycled aviation fuels and diesel fuels. There is a need to develop even more feasible and effective processes in these areas.

Diesel fuels of biological origin are already presently offered in the market, but there is a continuous demand for more efficient processing and enhanced product quality.

Aviation fuel market has been forecasted to grow during 2018-2022 at a CAGR (Compound Annual Growth Rate) of 3.81%. IATA (International Air Transport Association) recognizes the need to address the global challenge of climate change and adopted a set of ambitious targets to mitigate $CO_2$ emissions from air transport. One way to achieve this is by improved technology, including the deployment of sustainable low-carbon fuels.

The deployment of more sustainable aviation fuels means that more feedstock material must be made available globally to supply both the aviation industry and road transportation sector. The synthetic or renewable fuel production technologies have traditionally been designed for producing fuels for the road transportation sector where the fuels' cold temperature properties are not as critical as in aviation.

There is a clear need for a process to produce lighter fuels meeting jet fuel or aviation fuel requirements. Yet, at the same time, production flexibility in view of producing desired fuel grade to serve two or more transportation sectors needs to be maintained.

Furthermore, improving the feedstock usage efficiency resulting in lower production losses contributes both to sustainability and profitability of the fuel production process in the long run.

SUMMARY

The following presents a simplified summary of the features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

In the first aspect the present invention provides a method for combined production of an aviation fuel and a diesel fuel both of biological origin, the method comprising providing feedstock of biological origin containing fatty acids and/or esters of fatty acids, and subjecting the feedstock to hydrotreatment and isomerization to obtain a paraffinic hydrocarbon intermediate, and fractionating said paraffinic hydrocarbon intermediate into at least two fractions; a lighter fraction fulfilling the specification ASTM D7566-20 Annex A2 for aviation fuel, and a heavier fraction fulfilling the specification EN 15940-18 for renewable diesel fuel, wherein the production capacity of the lighter fraction and the production capacity of the heavier fraction are adjusted by a selection of process conditions, preferably the hydroisomerization process conditions, wherein yield of the lighter fraction is 20-90 wt-% of the total weight of the two fractions, and yield of the heavier fraction is 10-80 wt-% of the total weight of the two fractions, and wherein a combined yield of the two fractions is at least 98 wt-% of the paraffinic hydrocarbon intermediate of biological origin.

In the second aspect, a diesel fuel component of biological origin is provided comprising 0-5 wt-% of n-paraffins in C16-C20 range and 90-97 wt-% isoparaffins in C16-C20 range, from 21 wt-% to 45 wt-% of C17 paraffins and from 50 wt-% to 75 wt-% of C18 paraffins.

In the third aspect, use of the diesel fuel component of biological origin according to the invention as diesel fuel or for a diesel fuel blend fulfilling the requirements of EN 15940-18 or EN590-14 is provided.

In the fourth aspect, various diesel fuel blends are provided comprising the diesel fuel component according to the present invention together with fossil diesel fuel, renewable diesel fuel and biodiesel as depicted by the claims.

One or more examples of implementations are set forth in more detail in the accompanying figures and the description below. Other features will be apparent from the description and figures, and from the claims.

The present invention provides a process for producing both lighter and heavier fuels meeting the aviation fuel and the diesel fuel requirements. Moreover, production flexibility in view of producing desired fuel grades to serve two or more transportation sectors is maintained by suitably fractionating the paraffinic hydrocarbon intermediate into the lighter fraction meeting the aviation fuel requirements and into the heavier fraction meeting the diesel fuel requirements. Consequently, the fractionation is a critical step because if done unsuccessfully, the products obtained may fail to meet either the aviation fuel or the diesel fuel requirements.

On the other hand, considerable benefits and production flexibility are obtained as through the well-executed fractionation the end products serve two or more transportation sectors. In the present invention, the feedstock usage efficiency is excellent and the production losses are low, meaning that the profitability of the fuel production process is high in the long run.

As there typically is less flexibility on the properties that the aviation fuel component must meet, it drives the fractionation process and leaves the heavier diesel fraction as the bottom product. In the method of the present invention it is beneficial that the heavier fraction recovered from the fractionation, hence a heavier fraction fulfilling the specification EN 15940-18 for a renewable diesel fuel or component thereof meets the diesel fuel specification as such, and exhibits even improved properties over other diesel fuel types when blended.

BRIEF DESCRIPTION OF THE FIGURES

In the following the invention will be described in greater detail by means of preferred embodiments with reference to the attached FIG. 1 and FIG. 2.

DETAILED DESCRIPTION OF EMBODIMENTS

Figure 1:
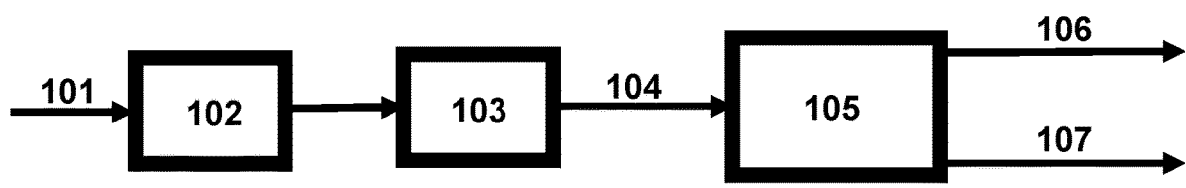
FIG. 1 illustrates an exemplary process.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may also contain features/structures that have not been specifically mentioned.

The present invention relates to combined production of two paraffinic hydrocarbon products, an aviation fuel component of biological origin and a diesel fuel component of biological origin by hydrotreatment and isomerization of feedstock of biological origin followed by fractionation. The aviation fuel component is preferably a synthesized paraffinic kerosine from hydrogenated esters and fatty acids (HEFA-SPK) fulfilling the ASTM D7566-20 Annex A2 standard for aviation turbine fuel containing synthesized hydrocarbons. The diesel fuel component is preferably a component fulfilling the EN 15940-18 standard for paraffinic diesel specifications.

By term "hydrotreatment" is meant herein a catalytic process of organic material by all means of molecular hydrogen. Preferably, hydrotreatment removes oxygen from organic oxygen compounds as water i.e. by hydrodeoxygenation (HDO). Additionally or alternatively hydrotreatment may remove sulphur from organic sulphur compounds as hydrogen sulphide ($H_2S$), i.e. by hydrodesulphurisation, (HDS), it may further remove nitrogen from organic nitrogen compounds as ammonia ($NH_3$), i.e. by hydrodenitrification (HDN), and/or it may remove halogens, for example chlorine, from organic chloride compounds as hydrochloric acid (HCl), i.e. by hydrodechlorination (HDCl). It may further remove aromatic compounds by hydrodearomatization (HDA).

By the term "hydrodeoxygenation" (HDO) is meant herein hydrodeoxygenation of feedstock of biological origin, such as feedstock comprising triglycerides or other fatty acid derivatives or fatty acids, is meant the removal of carboxyl oxygen as water by means of molecular hydrogen under the influence of a catalyst. The hydrodeoxygenation may be accompanied by hydrodesulphurisation, hydrodenitrification, and/or hydrodechlorination reactions.

Removing oxygen from the feedstock of biological origin may also be done by decarboxylation where oxygen is removed in the form of $CO_2$, and by decarbonylation where oxygen is removed in the form of CO.

By the term "isomerization" is meant reaction(s) that causes branching of hydrocarbon chains of hydrotreated feedstock. Branching of hydrocarbon chains improves e.g. cold properties, the isomerized hydrocarbons have better cold properties compared to merely hydrotreated feedstock. Better cold properties refer to e.g. a lower temperature value of a pour point. The formed isoparaffins (also referred to as i-paraffins) may have one or more side chains, or branches, typically methyl or ethyl groups.

Typically, HDO and isomerization, such as hydroisomerization, reactions take place in the presence of a catalyst suitable for the reaction. Reaction conditions and catalysts typically used in the hydrodeoxygenation of biological material and in the isomerization of resultant n-paraffins are disclosed in several documents. Examples of such processes are presented in e.g. FI100248, Examples 1-3, and in WO 2015/101837 A2.

Feedstock of Biological Origin

Feedstock of biological origin i.e. renewable feedstock refers to feedstock derived from biological raw material. The sources for renewable feedstock are numerous including oils and/or fats, usually containing lipids (e.g. fatty acids or glycerides), such as plant oil/fats, vegetable oil/fats, animal oil/fats, algae oil/fats, fish oil/fats and algae oil/fats, or oil/fats from other microbial processes, for example, genetically manipulated algae oil/fats, genetically manipulated oil/fats from other microbial processes and also genetically manipulated vegetable oil/fats. Components of these materials may also be used, for example, alkyl esters, typically C1-C5 alkyl esters, such as methyl, ethyl, propyl, iso-propyl, butyl, sec-butyl esters, or olefins. Additionally, the renewable feedstock may include C1-C5 alkyl alcohols, particularly methyl, ethyl, propyl, iso-propyl, butyl, and/or sec-butyl esters of fatty acids, and any combinations thereof.

The renewable feedstock may additionally include free fatty acids, fatty acid esters (including mono-, di-, and triglycerides), or combinations thereof. For example, the free fatty acids may include free fatty acids obtained by stripping free fatty acids from a triglyceride transesterification feedstock. The renewable feedstock may include the fatty acid distillate from vegetable oil deodorization.

Depending on level of pretreatment, fats, oils, and greases may contain impurities, such as between about 1 wppm and about 1,000 wppm phosphorus, and between about 1 wppm and about 500 wppm total metals, mainly sodium, potassium, magnesium, calcium, iron, and copper. Plant and/or vegetable oils and/or microbial oils may include babassu oil, carinata oil, soybean oil, canola oil, coconut oil, rapeseed oil, crude tall oil (CTO), tall oil (TO), tall oil fatty acid (TOFA), tall oil pitch (TOP), palm oil (PO), palm oil fatty acid distillate (PFAD), jatropha oil, palm kernel oil, sunflower oil, castor oil, camelina oil, archaeal oil, bacterial oil, fungal oil, protozoal oil, algal oil, seaweed oil, oils from halophiles, and mixtures of any two or more thereof. These oils may have been classified as crude, degummed, and RBD (refined, bleached, and deodorized) grade, depending on the level of pretreatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease from municipalities such as water treatment facilities, and spent oils from industrial packaged food operations, and mixtures of any two or more thereof.

These oils and/or fats typically comprise C10-C24 fatty acids and derivatives thereof, including esters of fatty acids, glycerides, i.e. glycerol esters of fatty acids.

The glycerides may specifically include monoglycerides, diglycerides and triglycerides.

In one embodiment, the feedstock includes waste and residue material originating from animal fat/oil, plant fat/oil such as palm oil and derivatives thereof, and used cooking oil (UCO).

The $^{14}C$-isotope content can be used as evidence of the renewable or biological origin of a feedstock or product. Carbon atoms of renewable material comprise a higher number of unstable radiocarbon ($^{14}C$) atoms compared to carbon atoms of fossil origin. Therefore, it is possible to distinguish between carbon compounds derived from biological sources, and carbon compounds derived from fossil sources by analysing the ratio of $^{12}C$ and $^{14}C$ isotopes. Thus, a particular ratio of said isotopes can be used to identify renewable carbon compounds and differentiate those from non-renewable i.e. fossil carbon compounds. The isotope ratio does not change in the course of chemical reactions. Example of a suitable method for analysing the content of carbon from biological sources is ASTM D6866 (2020). An example of how to apply ASTM D6866 to determine the renewable content in fuels is provided in the article of Dijs et al., Radiocarbon, 48(3), 2006, pp 315-323. For the purpose of the present invention, a carbon-containing material, such as a feedstock or product is considered to be of renewable origin if it contains 90% or more modern carbon (pMC), such as about 100% modern carbon, as measured using ASTM D6866.

The oils and/or fats of biological origin may include a single kind of oil, a single kind of fat, mixtures of different oils, mixtures of different fats, mixtures of oil(s) and fat(s), fatty acids, glycerol, and/or mixtures of the afore-mentioned. Typically, when waste and residue material are used they comprise mixtures of several components.

In an embodiment, the feedstock of biological origin contains C8-C22 hydrocarbons, C10-C20 hydrocarbons, or C15-C18 hydrocarbons.

Hydrotreatment

Several process conditions for hydrodeoxygenation are known. For example, the hydrodeoxygenation of feedstock of biological origin may be carried out on sulfided metal catalyst or a metal sulphide catalyst. The metal may comprise one or more Group VI metals, such as Mo or W, or one or more Group VIII non-noble metals such as Co or Ni. The catalyst may be supported on any convenient support, such as alumina, silica, zirconia, titania, amorphous carbon, zeolite, molecular sieves or combinations thereof. Usually the metal is impregnated or deposited on the support as metal oxides and then typically converted into their sulphides. Examples of typical catalysts for hydrodeoxygenation are molybdenum containing catalysts, NiMo, CoMo, CoNiMo or NiW catalysts, supported on alumina or silica, but many other hydrodeoxygenation catalysts are known in the art, and have been described together with or compared to NiMo and/or CoMo catalysts. The hydrodeoxygenation is preferably carried out under the influence of sulphided NiMo or sulphided CoMo or NiW catalysts in the presence of hydrogen gas.

The hydrodeoxygenation may be performed under a hydrogen pressure from 10 to 200 bar (absolute), at temperatures from 200 to 400° C., and liquid hourly space velocities of $0.2\ h^{-1}$ to $10\ h^{-1}$. During a hydrodeoxygenation step using a sulfided catalyst, the sulfided state of the catalyst may be maintained by addition of sulphur in the gas phase or by using a feedstock having sulphur containing mineral oil blended with the feedstock of biological origin. The sulphur content of the total feed being subjected to hydrodeoxygenation may be, for example, in the range of 50 wppm (ppm by weight) to 20 000 wppm, preferably in the range of 100 wppm to 1000 wppm.

Effective conditions for hydrodeoxygenation may reduce the oxygen content of the feedstock of biological origin to less than 1 wt-%, such as less than 0.5 wt-% or even less than 0.2 wt-%. In some cases, the conditions may be selected to yield partial hydrodeoxygenation corresponding to a deoxygenation of at least 40 wt-%, at least 50 wt-% or at least 75 wt-%, based on weight of the feedstock.

In a preferred embodiment, preparing a paraffinic hydrocarbon intermediate of biological origin from feedstock of biological origin comprises subjecting the feedstock to a deoxygenation treatment.

In the present invention, the deoxygenating method is not particularly limited and any suitable method may be employed. Suitable methods are, for example, hydrotreating, such as hydrodeoxygenation (HDO), catalytic hydrodeoxygenation (catalytic HDO), catalytic cracking (CC), or a combination thereof. Other suitable methods include decarboxylation and decarbonylation reactions, either alone or in combination with hydrotreating.

In one embodiment, the deoxygenation treatment, to which the feedstock of biological origin is subjected, is hydrotreatment. Preferably, the feedstock of biological origin is subjected to hydrodeoxygenation (HDO) which preferably uses a HDO catalyst. Catalytic HDO is the most common way of removing oxygen and has been extensively studied and optimized. However, the present invention is not limited thereto. As the HDO catalyst, a HDO catalyst comprising hydrogenation metal supported on a carrier may be used. Examples include a HDO catalyst comprising a hydrogenation metal selected from a group consisting of Pd, Pt, Ni, Co, Mo, Ru, Rh, W or a combination of these, preferably from Ni, Mo or W. Alumina or silica is suited as a carrier, among others. The hydrodeoxygenation step may, for example, be conducted at a temperature of 100-500° C. and at a pressure of 10-150 bar (absolute).

In one embodiment, the hydrotreatment, preferably hydrodeoxygenation, is performed under a hydrogen pressure from 10 to 150 bar, such as 20-120 bar, such as 30-100 bar, and at a temperature from 200 to 400° C., such as 250-380° C., such as 280-360° C.

In one embodiment, the hydrotreatment is performed in the presence of one or more catalyst(s) selected from hydrogenation metal on a support, such as a catalyst selected from a group consisting of Pd, Pt, Ni, Co, Mo, Ru, Rh, W or any combination thereof, preferably a catalyst comprising one or more catalyst(s) selected from CoMo, NiMo, NiW, CoNiMo on a support, for example an alumina support.

The hydrodeoxygenation may be accompanied by hydrodesulphurisation, hydrodearomatization, hydrodenitrification, and/or hydrodechlorination reactions.

Preparing a hydrotreated feedstock from the feedstock of biological origin may comprise a step of hydrocracking hydrocarbons in feedstock of biological origin. Thus, the chain length of the hydrocarbon of biological origin may be adjusted and the product distribution of the produced mixture of hydrocarbons of biological origin can be indirectly controlled.

Isomerization

The paraffinic hydrocarbon intermediate of biological origin of the present invention may be provided by subjecting at least the straight chain hydrocarbons obtained by hydrotreatment to an isomerization.

While most thermal or catalytic conversions (such as HDO) result in a minor degree of isomerization, usually less than 5 wt-%, or even less than 1 wt-%, such as 0.5 wt-% or less, the isomerization step may be employed as a step which leads to a significant increase in the content of isoparaffins.

Isomerization causes branching of hydrocarbon chains of the hydrotreated feedstock. Branching of hydrocarbon chains improves e.g. cold properties, the isomerized hydrocarbons have better cold properties compared to merely hydrotreated feedstock. Better cold properties refer to e.g. a lower temperature value of a pour point and/or cloud point. The formed isoparaffins may have one or more side chains, or branches, typically methyl or ethyl groups.

The isomerization step may be carried out in the presence of an isomerization catalyst, and preferably in the presence of hydrogen added to the isomerization process. The presence of added hydrogen is particularly preferable to reduce catalyst deactivation. Suitable isomerization catalysts contain a molecular sieve and/or a metal selected from Group VIII of the periodic table and optionally a carrier. Preferably, the isomerization catalyst contains SAPO-11, or SAPO-41, or ZSM-22, or ZSM-23, or ferrerite, and Pt, Pd, or Ni, and $Al_2O_3$, or $SiO_2$. Typical isomerization catalysts are, for example, Pt/SAPO-11/$Al_2O_3$, Pt/ZSM-22/$Al_2O_3$, Pt/ZSM-23/$Al_2O_3$, and Pt/SAPO-11/$SiO_2$. The catalysts may be used alone or in combination. In a preferred embodiment, the isomerization catalyst is a noble metal bifunctional catalyst, such as Pt-SAPO and/or Pt-ZSM-catalyst, which is used in combination with hydrogen.

The isomerization step, preferably hydroisomerization, may, for example, be conducted at a temperature of 200-500° C., such as 280-400° C., such as 280-370° C. and at a pressure of 10-150 bar (absolute), such as 20-100 bar, such as 20-50 bar.

The isomerization is performed, for example, in the presence of one or more catalyst(s) comprising a Group VIII metal on a support, where the support is selected from silica, alumina, clays, titanium oxide, boron oxide, zirconia, which can be used alone or as a mixture, preferably silica and/or alumina.

In an embodiment, the isomerization is performed at a temperature of 300° C. or above, preferably at 300-350° C., such as 330-350° C.

The Paraffinic Hydrocarbon Intermediate of Biological Origin

The paraffinic hydrocarbon intermediate of biological origin of the present invention may be provided by isomerizing a hydrotreated feedstock of biological origin.

Generally, a paraffinic hydrocarbon intermediate may be produced from the feedstock of biological origin material using any known method. Specific examples of a method for producing the paraffinic intermediate of biological origin are provided in the European patent application EP 1741768 A1. Also, other methods may be employed, particularly another BTL (biomass-to-liquid) method may be chosen, for example biomass gasification followed by a Fischer-Tropsch method.

In an embodiment, the paraffinic hydrocarbon intermediate of biological origin may be obtained by hydrodeoxygenation and isomerization of feedstock of biological origin. The paraffinic hydrocarbon intermediate, such as liquid hydrocarbon intermediate, thus obtained has a carbon number distribution in the range of C8 to C22 or C10 to C20, preferably in the range of C15 to C18, and distillation range of 140° C. to 340° C., preferably 180° C. to 320° C. The paraffinic hydrocarbon intermediate contains mainly n-paraffins and i-paraffins.

The amount of i-paraffins may be adjusted through isomerization, such as isomerization temperature, to reach desired characteristics of the product fractions.

In an embodiment, the cloud point of the paraffinic hydrocarbon intermediate of biological origin is −30° C. or below, −34° C. or below, −40° C. or below, or −48° C. or below, as measured according to EN23015.

Examples of Production of the Paraffinic Hydrocarbon Intermediate of Biological Origin The feedstock of biological origin may be subjected at least to a hydrodeoxygenation reaction in the presence of hydrogen and a hydrodeoxygenation catalyst, and to an isomerization reaction in the presence of an isomerization catalyst, for obtaining the paraffinic hydrocarbon intermediate. If a hydrodeoxygenation step and an isomerization step are applied, these may be performed either simultaneously or in sequence.

In one embodiment the paraffinic hydrocarbon intermediate is produced in two steps, first hydrotreating the feedstock and subsequently isomerizing the hydrotreated feedstock. The hydrodeoxygenation reaction may be performed in the presence of hydrogen gas and a hydrodeoxygenation catalyst, such as CoMo, NiMo, NiW, CoNiMo on a support, for example, an alumina support, zeolite support, or a mixed support. The hydrodeoxygenation reaction may, for example, be conducted at a temperature in the range from 250 to 400° C., and at a pressure in the range from 10-150 bar, for example 250-380° C. and 20-120 bar, such as 280-360° C. and 30-100 bar, at a WHSV (weight hourly space velocity, i.e. mass flow/catalyst mass) in the range from 0.5 to 3 h-1, and a $H_2$/oil ratio of 350-900 Nl/l, using a catalyst, such as NiMo, optionally on an alumina support. The product of the hydrodeoxygenation step, i.e. the hydrotreated feedstock of biological origin, may be subjected to an isomerization step in the presence of hydrogen and an isomerization catalyst. The isomerization is preferably performed in the presence of one or more catalyst(s) comprising a Group VIII metal on a support, where the support is selected from silica, alumina, clays, titanium oxide, boron oxide, zirconia, which can be used alone or as a mixture, preferably silica and/or alumina. The isomerization catalyst may be a noble metal bifunctional catalyst such as Pt-SAPO or Pt-ZSM catalyst or NiW. The isomerization reaction may, for example, be conducted at a temperature of 200-500° C. and at a pressure of 10-150 bar (absolute). The isomerization reaction may, for example, be conducted at a temperature of 280-370° C., at a pressure of 10-50 bar (absolute), with WHSV of 0.5-3 h-1, and $H_2$/feed ratio of 100-800 Nl/l.

In one embodiment the hydrodeoxygenation and hydroisomerization are carried out in a single step on the same catalyst bed using a single catalyst for this combined step, e.g. NiW, or a Pt catalyst, such as Pt/SAPO in a mixture with a Mo catalyst on a support, e.g. NiMo on alumina.

The hydrotreatment step and the isomerization step may be conducted in the same reactor. Alternatively, hydrotreatment step and the isomerization step may be conducted in separate reactors.

In a specific embodiment the present invention provides a method for production of the diesel fuel component of biological origin comprising hydrodeoxygenating and hydroisomerizing a feedstock of biological origin to obtain a paraffinic hydrocarbon intermediate; and fractionating the paraffinic hydrocarbon intermediate into at least two fractions, comprising a light fraction fulfilling the specification for an aviation fuel component, and a heavy fraction fulfilling the specification for a diesel fuel component, wherein the production capacity of the lighter fraction and the production capacity of the heavier fraction are adjusted by the selection of process conditions, preferably the isomerization conditions, wherein a yield of the lighter fraction is 20-90 wt-% of the total weight of the fractions, and a yield of the heavier fraction is 10-80 wt-% of the total weight of the fractions, and wherein the aviation fuel component is HEFA-SPK fuel component, and wherein a specification for the HEFA-SPK fuel component is ASTM D7566-20, and wherein a combined yield of the two fractions is at least 98 wt-% of the paraffinic hydrocarbon intermediate of biological origin. Although the fractionation of the paraffinic hydrocarbon intermediate allows recovery of a lighter fraction meeting specifications for the HEFA-SPK fuel, surprisingly the heavier fraction was by no means a residue, but according to the present method was recoverable as a diesel fuel component of biological origin meeting specification EN 15940-18 for renewable diesel fuel or component.

Fractionation

The paraffinic hydrocarbon intermediate of biological origin of the present invention provided by isomerized hydrotreated feedstock is suitably fractionated for obtaining at least two fuel components, one suitable for as aviation fuel and one suitable for as diesel fuel.

In an embodiment, the fractionating is provided by distillation. In the distillation process, the cloud point, distillation profile and density of the paraffinic hydrocarbon intermediate influences the yields of the distillates. To maximize the yield of the aviation fuel component, or more specifically HEFA-SPK component, a paraffinic hydrocarbon intermediate with a lower cloud point may be utilized. A typical cloud point of the paraffinic hydrocarbon intermediate may be in the range of −30° C. or below, or in the range of −34° C. or below, without restricting it to that.

The balance between renewable diesel fuel component and aviation fuel component amounts or volumes produced may be adjusted by the selection of process conditions in the production process of the paraffinic hydrocarbon intermediate of biological origin, which affects the distillation cut point between the product fractions. This makes it possible to provide a cost-efficient and material-efficient yet flexible way to produce these paraffinic products of biological origin with only trace amounts of by-products, if any, being produced. For example, less than 2 wt-% or even less than 1 wt-% of by-products lighter than aviation fuel or heavier than diesel fuel, may be generated. This means that the yield of the two fractions is at least 98 wt-% or at least 99 wt-%, calculated from the amount of paraffinic hydrocarbon intermediate subjected to fractionating. In certain embodiments the yield of the two fractions may be 99.5 wt-%, 99.8 wt-% or even 100 wt-% of amount of paraffinic hydrocarbon intermediate subjected to fractionating.

In an embodiment, yield of the lighter fraction is 20-90 wt-% of the total weight of the two fractions, and a yield of the heavier fraction is 10-80 wt-% of the total weight of the two fractions.

In an embodiment, yield of the lighter fraction is 60-90 wt-% of the total weight of the two fractions, and a yield of the heavier fraction is 10-40 wt-% of the total weight of the two fractions.

In an embodiment, yield of the lighter fraction is 70-90 wt-% of the total weight of the two fractions, and a yield of the heavier fraction is 10-30 wt-% of the total weight of the two fractions.

In an embodiment, yield of the lighter fraction is 80-90 wt-% of the total weight of the two fractions, and a yield of the heavier fraction is 10-20 wt-% of the total weight of the two fractions.

Shorter chain hydrocarbons enable producing more aviation fuel component and less diesel fuel component. More diesel fuel component is produced by using plenty of C16 or hydrocarbons having higher carbon number, such as from C16 to C29, as the feedstock of biological origin.

Fuel compositions boil over a temperature range as opposed to having a single boiling point for a pure compound, due to a selection of compounds of varying carbon chain length ranges included therein. The boiling range covers a temperature interval from the initial boiling point, IBP, defined as the temperature at which the first drop of distillation product is obtained, to a final boiling point, FBP, when the highest-boiling compounds evaporate.

According to an embodiment, a paraffinic hydrocarbon intermediate of biological origin having a cloud point (CP), verified with analysis method ASTM D5773 for example, of −45° C., and having a freezing point (FP), verified for example with analysis method IP 529, of −41° C., and being of biological origin, such as vegetable origin, is distilled into two cuts: IBP-68% and 68%-FBP. This enables obtaining just two products, one (IBP-68%) fulfilling the HEFA-SPK specification ASTM D7566-20 Annex A2 and one (68%-FBP) fulfilling the standard EN 15940 for the diesel, without the need for any other processing steps. A yield of the light cut (IBP-68%) fulfilling the HEFA-SPK specification of 68 wt-% may be obtained, and a yield of the heavy fraction (68%-FBP) fulfilling the diesel specification of 32 wt-% may be obtained.

According to another embodiment, a paraffinic hydrocarbon intermediate of biological origin having a cloud point (CP) of −49° C. or below, may be distilled into two cuts: IBP-80% and 80%-FBP, which thus enables obtaining two products only, one (IBP-80%) fulfilling the HEFA-SPK specification and the other (80%-FBP) fulfilling the standard for the diesel, without the need for other processing steps. A yield of the light cut fulfilling the HEFA-SPK specification of 80 wt-% may be obtained, and a yield of the heavy fraction fulfilling the diesel specification of 20 wt-% may be obtained. Hence a particularly high aviation fuel production yield is obtained.

According to another embodiment, a paraffinic hydrocarbon intermediate of biological origin having a cloud point (CP) of −33° C. or below, may be distilled into two cuts: IBP-23% and 23%-FBP, which thus enables obtaining two products only, one (IBP-23%) fulfilling the HEFA-SPK specification and the other (23%-FBP) fulfilling the standard for the diesel, without the need for other processing steps.

The present invention thus discloses a method for combined production of two paraffinic hydrocarbon products, an aviation fuel component and a diesel fuel component, by hydrodeoxygenation and isomerization of feedstock of biological origin followed by fractionating. More specifically, the present invention discloses a method for combined production of paraffinic products of biological origin, comprising hydrodeoxygenation and isomerization of feedstock of biological origin, followed by fractionating thus obtained paraffinic hydrocarbon intermediate by e.g. distillation into at least two fractions, such as two fractions. Preferably, the two fractions are a lighter fraction fulfilling the specification for an aviation fuel component, and a heavier fraction fulfilling the specification for a diesel fuel component. A lighter fraction means that it is a lower temperature boiling range fraction, and the heavier fraction means that it is a higher temperature boiling range fraction compared to the lighter fraction.

The processing conditions may be selected suitably to obtain a desired yield ratio for the two fractions, and to adjust the technical performance characteristics thereof. Especially, a higher temperature and/or longer residence time in the isomerization stage may be applied to increase the downstream distillation yield of the HEFA-SPK component. Moreover, selecting feedstock of biological origin providing a high amount of hydrocarbons shorter than or equal to C17 hydrocarbons may increase the yield of the HEFA-SPK component.

In one embodiment, the paraffinic hydrocarbon intermediate for the fractionation, preferably by distillation, is provided by catalytic hydrotreatment and catalytic isomerization of feedstock of biological origin.

In another embodiment, the hydrotreatment is catalytic hydrodeoxygenation.

In a yet further embodiment, the paraffinic hydrocarbon intermediate may be obtained by combined hydrotreatment and isomerization, preferably combined catalytic hydrotreatment and isomerization.

In some cases feedstock may contain recycled material in addition to e.g. waste and residues, such as recycled plastics material of biological origin, for example.

One embodiment enables the use of the paraffinic hydrocarbon intermediate production process for combined production of two high value products. It is seen beneficial for the aviation fuel product to fractionate out the heaviest components from the paraffinic hydrocarbon intermediate as explained, whereas it is at the same time needed to remove the lightest components from diesel product to ensure safety in terms of adequately high flash point.

In an embodiment, the production capacity of the diesel fuel component and the aviation fuel component may be adjusted by the selection of the process conditions and feedstock composition in the paraffinic hydrocarbon intermediate production process. This makes it possible to find a cost-efficient and material-efficient way for production of these products without formation of any other by-products.

Figure 2:
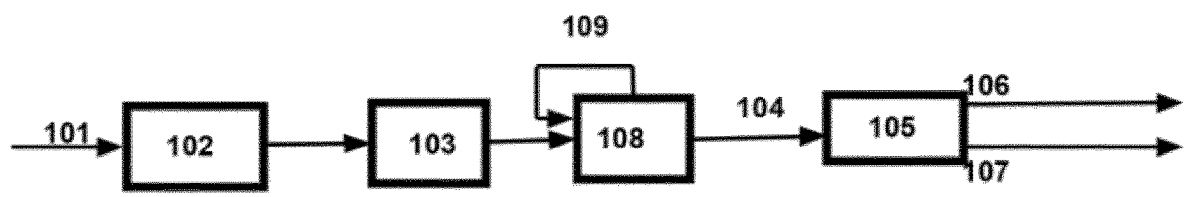
FIG. 2 illustrates another exemplary process.

The low temperature performance of the diesel fuel component and/or the aviation fuel component may be improved by having a high isoparaffin content of the paraffinic hydrocarbon intermediate through adjusting the isomerization. The isomerization temperature may be selected from the higher end of the temperature range, such as from 330° C. to 340° C., whereby cracking tendency is enhanced. Moreover, the density and the flash point of the obtained components may be decreased by increasing the reflux rate of lighter components after isomerization. The liquid effluent from the isomerization may be directed to stabilization in a stabilization column at lowered pressure compared to isomerization, wherein an overhead fraction is formed in addition to the liquid paraffinic hydrocarbon intermediate. This overhead fraction comprises hydrocarbons in the naphtha range (C4-C8). This overhead fraction from the stabilization may be recovered and used as a gasoline component, or preferably, it may be recycled back to the stabilization for refluxing, preferably into the stabilization column as depicted in FIG. 2. Thus, preferably according to the present invention the feedstock is subjected, after hydrotreatment and isomerization, to stabilization at a pressure lower than the isomerization pressure. The recycled amount of the hydrocarbons in the naphtha range used for refluxing may be from 80 wt-% or more, preferably 90 wt-% or more, such as from 90 to 95 weight-%, of the formed hydrocarbons in the naphtha range at the stabilization column overhead. A high recycle amount aids in the subsequent separation of the lighter and heavier fractions, and increases the yields of the obtained aviation fuel and diesel fuel components. Naturally, a higher refluxing requires adjustment of the equipment for higher flow. Thus, preferably according to the present invention during stabilization an overhead fraction comprising hydrocarbons in the naphtha range (C4-C8) is formed, and an amount of 60 wt-% or more, such as 90 wt-% or more, such as from 90 to 95 wt-%, of the formed hydrocarbons in the naphtha range at the stabilization column overhead is recycled back to the stabilization.

For the diesel fuel component it may be beneficial to further refine the diesel fuel component containing fraction by a second fractionating step to eliminate even trace amounts of heavy components or other impurities.

FIG. 1 illustrates an exemplary process wherein feedstock of biological origin (101) is subjected to hydrotreatment and isomerization in two reaction steps, namely first subjecting the feedstock to hydrodeoxygenation in a hydrodeoxygenation zone (102) and subsequently subjecting the hydrodeoxygenated feedstock to isomerization in an isomerization zone (103). The paraffinic hydrocarbon intermediate (104) obtained after isomerization is further subjected to fractionation by distillation in a distillation column (105). As a result, two fractions (106 and 107) are obtained from the distillation. In the two fractions, the lighter fraction (106) is a distillate fulfilling a specification for HEFA-SPK fuel component, and the heavier fraction (107), which may be the bottom fraction, is suitable for a diesel fuel component. The HEFA-SPK fuel component (106) may be obtained from paraffinic hydrocarbon intermediate 104 during a distillation from an initial boiling point (IBP) to for example cut point of about 280-290° C., such as 282° C., to achieve a HEFA-SPK component (106) with a mass yield of 68 wt-% compared to distillation feed (104). Consequently, the distillation bottom component (107) is obtained from cut point of about 280-290° C., such as 282° C., to final boiling point (FBP) with a 32 wt-% yield compared to distillation feed mass. The diesel fuel component (107) may be the bottom fraction from the distillation column (105), or the heavier fraction from the distillation (105).

FIG. 2 illustrates another exemplary process, wherein feedstock of biological origin (101) is subjected to hydrotreatment and isomerization in two reaction steps, namely first subjecting the feedstock to hydrodeoxygenation in a hydrodeoxygenation zone (102) and subsequently subjecting the hydrodeoxygenated feedstock to isomerization in an isomerization zone (103). The hydrodeoxygenated and isomerized feedstock enters stabilization in a stabilization zone 108. During stabilization a gaseous overhead fraction is formed due to pressure decrease, and in addition the liquid paraffinic hydrocarbon intermediate (104) may be directed into fractionation (105). The gaseous overhead fraction comprises hydrocarbons in the naphtha range (C4-C8). Most of these naphtha range hydrocarbons of the overhead fraction from stabilization are recycled (109) back to stabilization. The liquid paraffinic hydrocarbon intermediate (104) obtained is further subjected to fractionation by distillation in a distillation column (105). As a result, two fractions (106 and 107) are obtained from the distillation. In the two fractions, the lighter fraction (106) is a distillate fulfilling a specification for aviation fuel component, and the heavier fraction (107), which may be the bottom fraction, fulfils a specification for diesel fuel component. As an example, HEFA-SPK fuel component (106) fulfilling the specification ASTM D7566-20 Annex A2 may be obtained from paraffinic hydrocarbon intermediate (104) during a distillation from an initial boiling point (IBP) to cut point of, for example, about 280-290° C., such as 282° C., to achieve a HEFA-SPK component (106) with a mass yield of 68 wt-% compared to distillation feed (104) mass. Consequently, the distillation bottom diesel fuel component (107) is obtained from cut point of, for example, about 280-290° C., such as 282° C., to final boiling point (FBP) with a 32 wt-% yield compared to distillation feed mass. The diesel fuel component (107) may be the bottom fraction from the distillation column (105), or the heavier fraction from the distillation (105).

The Aviation Fuel Component of Biological Origin

A specification for an aviation fuel component may refer to one or more or all specifications of ASTM D7566-20 Annex A2 for HEFA-SPK (synthesized paraffinic kerosene from hydroprocessed esters and fatty acids), such as density (at 15° C.), flash point, freezing point, thermal stability, distillation-10% recovery, distillation-50% recovery, distillation-FBP, distillation-residue, distillation-loss, and/or existent gum, especially at least density (at 15° C.), thermal stability and freezing point.

In an embodiment, a HEFA-SPK fuel component obtainable by said method is disclosed.

In an embodiment, the HEFA-SPK fuel component has a density of less than 772 kg/m$^3$ as measured at 15° C. according to ASTM D4052, preferably less than 770 kg/m$^3$, more preferably less than 769 kg/m$^3$.

In an embodiment the HEFA-SPK fuel component has a density of from 772 kg/m$^3$ to 750 kg/m$^3$, preferably 772 kg/m$^3$ to 760 kg/m$^3$, more preferably from 770 kg/m$^3$ to 765 kg/m$^3$ as measured at 15° C. according to ASTM D4052

In an embodiment the HEFA-SPK fuel component has a freezing point of less than −40° C. as measured according to IP529, preferably less than −45° C., more preferably less than less than −50° C., most preferably less than −53° C.

In an embodiment the HEFA-SPK fuel component has a freezing point from −40° C. to −65° C., preferably from −40° C. to −60° C., more preferably from −40° C. to −55° C. as measured according to IP529.

In an embodiment the HEFA-SPK fuel component has a flash point from 50° C. to 75° C., preferably from 60° C. to ° C. 70° C. as measured according to IP170.

The Diesel Fuel Component of Biological Origin

In an embodiment the present invention provides a diesel fuel component of biological origin, preferably manufactured by the method of the present invention. The diesel fuel component fulfils the requirements of EN 15940-18.

The diesel fuel component of biological origin may comprise 0-5 wt-% of n-paraffins in C16-C20 range and 90-97 wt-% isoparaffins in C16-C20 range, from 21 wt % to 45 wt % of C17 paraffins and from 50 wt % to 75 wt % of C18 paraffins.

In an embodiment the diesel fuel component of biological origin comprises 0-8 wt-% of n-paraffins in C17-C19 range, preferably 0-5 wt-% because with a reduced n-paraffin concentration the fuel cold properties e.g. cloud point and/or freezing point are improved.

In an embodiment the diesel fuel component of biological origin comprises 85-97 wt-% isoparaffins in C17-C20 range, preferably 88-97 wt-% because with an increased isoparaffin concentration the fuel cold properties are improved.

In an embodiment diesel fuel component of biological origin comprises from 21 wt % to 43 wt % of C17 paraffins.

In an embodiment the diesel fuel component of biological origin comprises from 45 wt % to 75 wt % of C18 paraffins, preferably 53-75 wt-%, to increase the fuel density and thus enable blending to EN 590 fossil diesel at higher blend ratios.

In an embodiment the diesel fuel component of biological origin comprises 0-4 wt-% of n-paraffins in C17-C18 range and 85-95 wt-% isoparaffins in C17-C18 range.

Characterisation of the hydrocarbons, such as analysis of n-paraffins, isoparaffins and defining the carbon numbers) may be conducted using Gas Chromatography/Flame Ionization method comparable to UOP990. The above wt-% refer to weight percentages as calculated from the total weight of the base oil component of biological origin.

In an embodiment isomerization degree of the diesel fuel component is 90-99.9%, such as 95-99%, wherein the isomerization degree is defined as the amount of i-paraffins to total paraffins by weight. The ratio of i-paraffins to n-paraffins in the C14-C20 range is from 18 to 32.

The diesel fuel component of biological origin complies with the EN 15940-18 standard for paraffinic diesel specifications and preferably has modern carbon content (pMC, ASTM D6866) of about 100%. In addition to fulfilling the criteria for EN 15940-18, the diesel fuel component further complies with at least one, preferably even all, of the requirements as defined by the following embodiments:

In an embodiment the diesel fuel component of biological origin has an EN 16091 oxidation stability of at least 60 min, such as at least 75 min, or even such as at least 100 min.

In an embodiment diesel fuel component of biological origin has density as measured at 15° C. between 765-800 kg/m$^3$, such as the lower limit being at least 786 kg/m$^3$, such as at least 788 kg/m$^3$ (EN ISO 12185).

In an embodiment the diesel fuel component of biological origin has cetane number of at least 75, such as at least 80 or even such as at least 82 (EN 15195).

In an embodiment the diesel fuel component of biological origin has total aromatics less than 1.1 wt-%, such as less than 0.7 wt-%, or such as less than 0.6 wt-% (EN 12916). The diesel fuel component of biological origin may even be essentially free of aromatics.

In an embodiment the diesel fuel component has kinematic viscosity at 40° C. as measured according to EN ISO 3104 of below 4.5 mm²/s, such as below 4.0 mm²/s, or even below 3.8 mm²/s.

In an embodiment the diesel fuel component has a flash point as measured according to EN ISO 2719 of at least 100° C., such as at least 130° C., more particularly at least 145° C.

In an embodiment the diesel fuel component has a cloud point (ASTM D7689) of less than −20° C., such as less than −25° C., such as less than −30° C., or even −32° C. or less.

In an embodiment the diesel fuel component has a net heat of combustion (ASTM D4809) within the range of 33 to 36 MJ/l.

The water content of the diesel fuel component (EN ISO 12937) is very low, less than 50 mg/kg, such as less than 30 mg/kg.

The diesel fuel component of the present invention may be used as such as diesel fuel fulfilling the requirements of EN 15940-18 without blending any further diesel components thereto. However, it is possible to add minor amounts of suitable and typically used additives, such as lubricity additive, into the diesel fuel component of the present invention, wherein the amount of such additives is less than 1 wt-%.

The properties of the diesel fuel component of the present invention as described in the foregoing embodiments can be combined in any possible way.

The diesel fuel component of the present invention may further be used for a diesel fuel blend fulfilling the requirements of EN 15940-18 or EN590-14.

The diesel fuel component of the present invention is preferably obtained by the method of the present invention.

Diesel Fuel Blends

The present invention also provides diesel fuel blends comprising the diesel fuel component of biological origin of the present invention with at least one additional diesel fuel component.

The additional diesel fuel component may comprise renewable diesel fuel, fossil diesel fuel and/or biodiesel.

By "renewable diesel fuel" is meant herein e.g. hydrotreated vegetable oil (HVO) which may be the regular renewable diesel fuel produced to meet the EN 15940 requirements that has not been further distilled into lighter and heavier fuel components or transportation fuel product fractions, such as C14-C20 fractions. One example of which is e.g. the commercially available Neste MY Renewable Diesel™, renewable diesel fuel obtained by a process according to e.g. EP1741768B1, or any other type of renewable diesel fuel, such as paraffinic hydrocarbons boiling in the diesel range made by e.g. varying ways of hydroprocessing or obtained by Fischer-Tropsch (FT) synthesis and fulfilling the EN 15940 criteria. Sometimes renewable diesel fuel is also called "synthetic paraffinic diesel" which may likewise comprise diesel boiling range paraffinic hydrocarbons obtainable from renewable feedstock by hydroprocessing, and diesel fuel from an FT-process, or mixtures thereof.

By "fossil diesel fuel" is meant herein diesel fuel or petroleum diesel i.e. fossil fuel made from crude oil containing hydrocarbons of the paraffinic, naphthenic, and aromatic classes. Each class contains a very broad range of carbon chain lengths and having thereby wide molecular weight distributions, defined by different standards depending on location, e.g. ASTM 975, EN 590. Fossil diesel fuel refers to diesel fuel produced from crude oil, such as crude oil produced in a crude oil refining facility and including straight-run diesel, hydrotreated fluidized catalytic cracker light cycle oil, hydrotreated coker light gasoil, hydrocracked FCC heavy cycle oil, and the like. Fossil diesel fuel is typically any fossil diesel fuel fulfilling the requirements of ASTM D 975 or EN 590 or premium diesel grade as defined by e.g. the Chevron Diesel Fuels Technical Review, 2007 (https://www.chevron.com/-/media/chevron/operations/documents/diesel-fuel-tech-review.pdf).

By "biodiesel" is meant herein oxygen containing fatty acid C1-C4 alkyl esters, such as fatty acid methyl ester (FAME), fatty acid ethyl ester (FAEE), fatty acid propyl ester (FAPE) or fatty acid butyl ester (FABE). Biodiesel is required to fulfil the requirements of ASTM D 6751 or EN 14214. For example, FAME biodiesel may typically be added to diesel fuel up to 7 vol-% according to EN 590, the standard specification for biodiesel blend stock (B100) for middle distillate fuels. European standard EN 14214 specifies requirements for fatty acid methyl esters (FAME) to be used at 100 percent concentration or as a fuel extender for use in diesel engines in accordance with EN 590.

The paraffinic diesel fuel blends of the present invention, when the diesel fuel component of the present invention is blended with HVO, comply with the EN 15940 standard for paraffinic diesel specification. The diesel fuel blends of the present invention, when the diesel fuel component of the present invention is blended with conventional diesel and/or FAME, comply with the EN 590 standard for conventional diesel. The diesel fuel component of the present invention and the diesel fuel blends of the present invention are suitable for use as diesel fuel.

In the following some exemplary diesel fuel blends according to the present invention are provided.

Diesel Fuel Blend I: Diesel Fuel Component of the Present Invention and Fossil Diesel Fuel In one embodiment the diesel fuel blend comprises the diesel fuel component of biological origin of the present invention and a fossil diesel fuel, wherein the blend comprises from 1 wt-% to 99 wt-% of the diesel fuel component of the present invention and from 1 wt-% to 99 wt-% of the fossil diesel fuel. Preferably, the amount of the diesel fuel component of the present invention is from 1 wt-% to 50 wt-%, such as from 25 wt-% to 50 wt-% the reminder being fossil diesel fuel, for enhancing the desired properties of the fossil fuel, in addition to the bio content.

Diesel Fuel Blend II: Diesel Fuel Component of the Present Invention and Renewable Diesel Fuel In one embodiment the diesel fuel blend comprises the diesel fuel component of biological origin of the present invention and renewable diesel fuel, wherein the blend comprises from 1 wt-% to 99 wt-% of the diesel fuel of the present invention and from about 1 wt-% to 99 wt-% of the renewable diesel fuel. In these type of blends, the bio content is not increased, but the preferred properties of the diesel fuel component of the present invention may provide superior properties to the renewable blend. Preferably, the amount of the diesel fuel component of the present invention is from about 1 wt-% to 50 wt-%, such as from 25 wt-% to 50 wt-% the reminder being renewable diesel fuel.

In one embodiment the blend comprises from 75 wt-% to 99 wt-% of the renewable diesel fuel, preferably 50-75 wt-%, the remainder being diesel fuel component of the present invention, to allow better cold properties e.g. cloud point and/or freezing point for the blend.

Diesel Fuel Blend III: Diesel Fuel Component of the Present Invention, Renewable Diesel and Fossil Diesel Fuel In one embodiment the diesel fuel blend comprises the diesel fuel component of biological origin of the present invention, renewable diesel and fossil diesel fuel, wherein the blend comprises from about 1 wt-% to 98 wt-% of the diesel fuel component of biological of the present invention, from about 1 wt-% to 98 wt-% of the renewable diesel and from about 1 wt-% to 98 wt-% of the fossil diesel fuel.

In one embodiment the blend comprises from 1 wt-% to 25 wt-% of diesel fuel component of the present invention, preferably 10-25 wt-%, the remainder being a mixture of renewable diesel fuel and fossil diesel fuel, to allow better oxidation stability, cetane number and/or cloud point for the blend.

In one embodiment the blend comprises from 19 wt-% to 25 wt-% of the renewable diesel fuel, preferably 19-22.5 wt-%, the remainder being a mixture of diesel fuel component of the present invention and fossil diesel fuel.

In one embodiment the blend comprises from 56 wt-% to 75 wt-% of the fossil diesel fuel, preferably 56-67.5 wt-%, the remainder being a mixture of diesel fuel component of the present invention and renewable diesel fuel.

Diesel Fuel Blend IV: Diesel Fuel Component of the Present Invention, Biodiesel and Fossil Diesel Fuel In one embodiment the diesel fuel blend comprises the diesel fuel component of biological origin of the present invention, biodiesel and fossil diesel fuel, wherein the blend comprises from about 1 wt-% to 98 wt-% of the diesel fuel component of the present invention, from about 1 wt-% to 98 wt-% of the biodiesel and from about 1 wt-% to 98 wt-% of the fossil diesel fuel.

In one embodiment the blend comprises from 1 wt-% to 50 wt-% of diesel fuel component of the present invention, preferably 25-50 wt-%, the remainder being biodiesel and fossil diesel fuel, to allow better oxidation stability, cetane number and/or cloud point for the blend.

In one embodiment the blend comprises from 5 wt-% to 7 wt-% of the biodiesel, preferably 3.5-5 wt-%, the remainder being diesel fuel component of the present invention and fossil diesel fuel.

In one embodiment the blend comprises from 46.5 wt-% to 92 wt-% of the fossil diesel fuel, preferably 46.5-70 wt-%, he remainder being diesel fuel component of the present invention and biodiesel.

Diesel Fuel Blend V: Diesel Fuel Component of the Present Invention, Renewable Diesel, Biodiesel and Fossil Diesel Fuel In one embodiment the diesel fuel blend comprises the diesel fuel component of biological origin of the present invention, renewable diesel fuel, biodiesel and fossil diesel fuel, wherein the blend comprises from about 1 wt-% to 97 wt-% of the diesel fuel component of the present invention, from about 1 wt-% to 97 wt-% of renewable diesel fuel from about 1 wt-% to 97 wt-% of biodiesel and from about 1 wt-% to 97 wt-% of the fossil diesel fuel.

In one embodiment the blend comprises from 1 wt-% to 50 wt-% of diesel fuel component of the present invention, preferably 25-50 wt-%, the remainder comprising a mixture of fossil diesel fuel, renewable diesel fuel and biodiesel, to allow better oxidation stability, cetane number and/or cloud point for the blend.

In one embodiment the blend comprises from 12.5 wt-% to 25 wt-% of renewable diesel fuel, preferably 12.5-19 wt-%, the remainder comprising a mixture of fossil diesel fuel, diesel fuel component of the present invention and biodiesel.

In one embodiment the blend comprises from 3.5 wt-% to 7 wt-% of biodiesel, preferably 3.5-5 wt-%, the remainder comprising a mixture of fossil diesel fuel, diesel fuel component of the present invention and renewable diesel fuel.

In one embodiment the blend comprises from 34 wt-% to 68 wt-% of the fossil diesel fuel, preferably 34-51 wt-%, remainder comprising a mixture of biofuel, diesel fuel component of the present invention and renewable diesel fuel.

The blends may be made by blending the components in any order, using commonly known methods. The blends may further include minor amounts of suitable and typically used additives, such as lubricity additive, wherein the amount of additives is less than 1 wt-%, thus reducing the amount of the further blending components of the blend.

For example, by making the blends above, the density, cloud point, oxidation stability and cetane number of the blends can be improved.

EXAMPLES

Example 1

Feedstock of biological origin provided for the experiments contained 73% AF (animal fat) and 27% PFAD (palm oil fatty acid distillate). After pretreatment by bleaching, the feedstock was subjected first to hydrodeoxygenation at about 300-340° C., about 50 bar, using sulphided NiMo on alumina catalyst with WHSV of about 2.7 h$^{-1}$ and hydrogen flow about 590 Nl/l feed. Subsequently, the hydrodeoxygenated paraffinic hydrocarbon feedstock was directed to isomerization at 330-340° C., about 40 bar, in the presence of Pt-SAPO catalyst with WHSV of about 1.5 h$^{-1}$ and a hydrogen to feed ratio of about 300 Nl/l feed. The effluent from the hydroisomerization was stabilized by refluxing the overhead naphtha about 92 wt-%.

The obtained paraffinic hydrocarbon intermediate was fractionated by distillation into two cuts. Four different cut points were utilized on laboratory scale measurements and one cut point in the plant scale, thus obtaining ten product cuts in total, five fulfilling the specification ASTM D7566-20 Annex A2 for HEFA-SPK and five fulfilling the standard EN 15940 for paraffinic diesel.

The distillation was performed in a laboratory scale batch distilling apparatus for obtaining the paraffinic hydrocarbon intermediate. Yields from the distillation were initial boiling point (IBP) to 70% distillation point: 70 wt-% (i.e. the HEFA-SPK cut),
70% distillation point to final boiling point (FBP): 30 wt-% (i.e. the diesel fuel component 1).
initial boiling point (IBP) to 75% distillation point: 75 wt-% (i.e. the HEFA-SPK cut),
75% distillation point to final boiling point (FBP): 25 wt-% (i.e. the diesel fuel component 2).
initial boiling point (IBP) to 80% distillation point: 80 wt-% (i.e. the HEFA-SPK Cut),
80% distillation point to final boiling point (FBP): 20 wt-% (i.e. the diesel fuel component 3).
initial boiling point (IBP) to 83% distillation point: 83 wt-% (i.e. the HEFA-SPK cut),
83% distillation point to final boiling point (FBP): 17 wt-% (i.e. the diesel fuel component 4).

Furthermore, a distillation was performed using plant scale batch distilling apparatus. Yields from the plant scale distillation were:

initial boiling point (IBP) to 68% distillation point (282° C.): 68 wt-% (i.e. the HEFA-SPK cut),
68% distillation point (282° C.) to final boiling point (FBP): 32 wt-% (i.e. the diesel fuel component 5).

Example 2

In Table 1, the distillation results for component 5 refer to key parameters defining the usability of the distilled product as a diesel component fulfilling the requirements of EN 15940-18 standard for paraffinic diesel specification. Component 5 further fulfills the other applicable requirements set in EN 15940-18, table 1, Class A.

TABLE 1

| Standard | Method | Unit | Product 68%-FBP (component 5) Result | Standard EN 15940-18 Class A Limit |
|---|---|---|---|---|
| EN ISO 3104 | Viscosity 40° C. | mm²/s | 3.76 | 2.0-4.5 |
| EN ISO 2719 | Flash point | ° C. | 136 | Min 55 |
| EN 12916 | Total aromatics | wt-% | 0.5 | Max 1.1 |
| EN 15195 | Cetane number | — | 82.6 | Min 70 |
| EN ISO 12185 | Density at 15° C. | kg/m3 | 787.1 | 765-800 |
| ASTM D7689 | Cloud point | ° C. | −33 | Max −10 |
| EN ISO 12937 | water content | mg/kg | 25 | Max 200 |
| EN 16091 | Oxidation stability | min | 63.38 | — |

The diesel fuel component 5 exhibits a high flash point which ensures safe product handling. Furthermore, the high cetane number and low cloud point ensure excellent combustion properties even at low winter temperatures.

Table 2 shows the chemical composition obtained for the diesel fuel component 5 cut. The total amount of i-paraffins were 95.20 wt-% and n-paraffins 4.80 wt-%.

TABLE 2

| Carbon chain length | Total paraffin amount (wt-%) | i-paraffin amount (wt-%) |
|---|---|---|
| C14 and below | 0.79 | 0.74 |
| C15 | 0.86 | 0.78 |
| C16 | 5.80 | 5.02 |
| C17 | 35.86 | 33.36 |
| C18 | 53.70 | 52.45 |
| C19 | 1.73 | 1.65 |
| C20 and above | 1.25 | 1.21 |

The diesel fuel component's carbon number distribution is concentrated on the C16-C18 range. The amount of longer carbon chains, C19 and above, and heavier traces is limited to less than 3 wt-% which explains the low product cloud point.

Furthermore, the low amount of shorter carbon chains, C15 and below, explains the high product flash point. The isomerization degree was high, over 95%.

The results shown in Table 3 demonstrate that the IBP-68% distilled product of example 1 meets the renewable aviation fuel specification (ASTM D7566-20, Annex A2) for HEFA-SPK. Density requirement of below 772 kg/m3 (measured at 15° C. according to ASTM D4052) was achieved with the performed distillation wherein density of the intermediate entered into the fractionation was 779 kg/m3 (measured at 15° C. according to ASTM D4052). A low freezing point of −49° C. well below the required −40° C. was achieved. In Table 3, the distillation results for IBP-68% of example 1 refer to key parameters defining the usability of the distilled product as aviation fuel component as defined in ASTM D7566-20. The distilled product IBP-68% of example 1 further fulfills the other applicable requirements set in ASTM D7566-20 Annex A2.

TABLE 3

| Standard | Method | Unit | IBP-68% | ASTM D7566-18 Annex A2 |
|---|---|---|---|---|
| ASTM D4052 | Density (at 15° C.) | kg/m³ | 771.8 | 730-772 |
| IP170 | Flash point | ° C. | 47.0 | Min. 38 |
| IP529 | Freezing point | ° C. | −49.5 | Max. −40 |
| ASTM D86 | Distillation-10% recovery | ° C. | 200.6 | Max. 205 |
| ASTM D86 | Distillation-50% recovery | ° C. | 266.0 | — |
| ASTM D86 | Distillation-FBP | ° C. | 285.3 | Max. 300 |
| IP540 | Existent gum | mg/100 ml | <1 | Max. 7 |
| ASTM D3242 | Total acidity | mg KOH/g | 0.002 | Max. 0.015 |

As shown on Table 4, the diesel fuel components of example 1 exhibit a distinct oxidation stability behaviour. The narrower the carbon distribution, the higher is the fuel's oxidation stability. Compared to a typical commercial HVO (hydrotreated vegetable oil) diesel product where the density is 780 kg/m3 and cetane number is 75-80, the density and cetane number of the diesel fuel components 1-4 of example 1 are higher. As the diesel fuel components 1-4 are produced by distillation, the cetane number also increases compared to the intermediate obtained from the isomerization. With a high flash point, the product can be handled more safely than typical diesel, as it is not categorized as flammable liquid according to the Regulation (EC No 1272/2008) on Classification, Labelling and Packaging (CLP). Between component cuts, the fuel exhibits properties for net heat of combustion, hydrogen content and total aromatics similar to commercial HVO diesel product.

The cold properties and cetane number of the diesel fuel components 1-4 of example 1 are superior to typical diesel fuels and the components comply with the EN 15940 standard for paraffinic diesel, and can therefore be used as such in diesel engines. Furthermore, they may be blended at any blending ratio with other diesel fuels.

TABLE 4

|  | Component 1 | Component 2 | Component 3 | Component 4 |
|---|---|---|---|---|
| Density (kg/m3) ENISO12185 | 787.7 | 787.8 | 787.9 | 788.0 |
| Flash point (° C.) ENISO2719 | 147.0 | 147.0 | 150.0 | 148.0 |
| Cetane number IQT EN15195 | 81.3 | 83.9 | 83.8 | 83.9 |
| Cloud point (° C.) ASTMD7689 | −36 | −33 | −33 | −32 |
| Oxidation stability (min) EN16091 | 74.95 | 77.96 | 97.83 | 103.51 |
| Total aromatics (wt-%) EN12916 | 0.2 | 0.3 | 0.3 | 0.3 |
| Hydrogen (wt-%) ASTMD5291 | 14.8 | 14.4 | 14.4 | 14.5 |
| Net heat of combustion (MJ/I) ASTMD4809 | 34.5 | 34.5 | 34.5 | 34.5 |
| n-paraffins (wt-%) | 3.2 | 3.8 | 3.7 | 3.9 |
| i-paraffins (wt-%) UOP990* | 96.8 | 96.2 | 96.3 | 96.1 |

*Gas Chromatography/Flame Ionization method comparable to UOP990 was used.

In tables 5 and 6, the distillation properties and carbon number distributions are shown, respectively.

TABLE 5

| ASTM D86 (EN ISO 3405) | Component 1 | Component 2 | Component 3 | Component 4 |
|---|---|---|---|---|
| IBP (° C.) | 288.8 | 286.0 | 290.1 | 274.5 |
| T10 (° C.) | 293.3 | 294.5 | 295.0 | 295.3 |
| T50 (° C.) | 294.2 | 295.3 | 295.8 | 296.2 |
| T90 (° C.) | 297.0 | 298.1 | 298.9 | 299.4 |
| T95 (° C.) | 300.2 | 301.6 | 302.5 | 303.7 |
| FBP (° C.) | 314.6 | 316.8 | 316.5 | 318.4 |
| Distillation residue (wt-%) | 1.8 | 1.7 | 2.0 | 1.8 |
| Distillation loss (wt-%) | 0.1 | 0.2 | <0.1 | 0.2 |

TABLE 6

| Carbon number (wt-%) | Component 1 | Component 2 | Component 3 | Component 4 |
|---|---|---|---|---|
| <C12 | 0 | 0 | 0 | 0 |
| 12 | 0 | 0 | 0 | 0.01 |
| 13 | 0 | 0 | 0 | 0.02 |
| 14 | 0 | 0 | 0 | 0.03 |
| 15 | 0 | 0 | 0 | 0.04 |
| 16 | 0 | 0 | 0 | 0.07 |
| 17 | 42.23 | 31.14 | 28.66 | 21.4 |
| 18 | 54.11 | 64.81 | 67.01 | 73.4 |
| >C18 | 3.66 | 4.06 | 4.33 | 5.03 |

Example 3

The diesel fuel component 5 obtained from example 1 was blended with fossil diesel product (Neste Futura diesel-5/-15, product card: https://www.neste.fi/static/datasheet_pdf/150240 fi.pdf). Table 7 presents the properties of the obtained blends.

TABLE 7

|  | Fossil diesel fuel | Fossil diesel 75 vol-% + Diesel fuel component 5 25 vol-% | Fossil diesel 50 vol-% + Diesel fuel component 5 50 vol-% | Diesel fuel component 5 |
|---|---|---|---|---|
| Cloud point (° C.) D7689 | −4.6 | −6.3 | −9.6 | −33.2 |
| Oxidation stability (min) EN16091 | 105.35 | 119.34 | 140.00 | 63.38 |
| Cetane number IQT D6890 | 52.0 | 56.1 | 62.1 | 82.6 |

The blends of diesel fuel component 5 and fossil diesel fuel exhibit improved cloud point compared to the cloud point of fossil diesel fuel. Additionally, the blends have improved oxidation stability and cetane number compared to oxidation stability and cetane number of fossil diesel fuel.

Example 4

The diesel fuel component 5 was blended with a commercially available HVO renewable diesel product (Neste MY Renewable Diesel, product card: https://www.neste.fi/static/datasheet_pdf/150450_en.pdf).

The HVO renewable diesel product has the following carbon number range distribution (wt-%):
C14 and below: 8.06
C15: 9.03
C16: 21.45 (i-paraffins 19,01)
C17: 20.78 (i-paraffins 18,33)
C18: 38.26 (i-paraffins 35,48)
C19: 0.85
C20 and above: 1.56
and includes 89.21 mass-% i-paraffins in total and 10.79 mass-% n-paraffins. The HVO diesel fuel has a density (ENISO12185) of 780.3 kg/m3. Table 8 presents the properties of the blends containing diesel fuel component 5 and the HVO renewable diesel fuel.

TABLE 8

|  | HVO renewable diesel fuel | HVO renewable diesel fuel 75 vol-% + Diesel fuel component 5 25 vol-% | HVO renewable diesel fuel 50 vol-% + Diesel fuel component 5 50 vol-% | Diesel fuel component 5 |
|---|---|---|---|---|
| Cloud point (° C.) ASTM D7689 | −22.5 | −24.4 | −25.0 | −33.2 |
| Oxidation stability (min) EN16091 | 65.69 | 63.26 | 61.99 | 63.38 |
| Cetane number IQT, ASTM D6890 | 92.7 | 91.2 | 90.4 | 82.6 |

The blends of the diesel fuel component 5 and HVO renewable diesel exhibit improved cloud point compared to the cloud point of the HVO renewable diesel fuel. The blends have acceptable oxidation stability and cetane number compared to oxidation stability and cetane number of the HVO diesel fuel. That is, the diesel fuel component 5 has a neutral effect on the oxidation stability and cetane number in the blends.

Example 5

The diesel fuel component 5 was further blended with typical fossil diesel product and the HVO renewable diesel product as explained in examples 3 and 4 by first making a pre-blend of fossil diesel fuel 75 vol-%+HVO renewable diesel fuel 25 vol-%, and subsequently blending this pre-blend with the diesel fuel component 5. Table 9 presents properties obtained for the pre-blend and the blend containing the diesel fuel component 5, HVO renewable diesel fuel and fossil diesel fuel.

TABLE 9

|  | Pre-Blend | Pre-Blend 75 vol-% + diesel fuel component 5 25 vol-% | Diesel fuel component 5 |
|---|---|---|---|
| Cloud point (° C.) D7689 | −6.4 | −8.7 | −33.2 |
| Oxidation stability (min) EN16091 | 101.49 | 114.98 | 63.38 |
| Cetane number IQT, D6890 | 58.4 | 63.7 | 82.6 |

The blend of diesel fuel component 5 with fossil diesel fuel and HVO renewable diesel fuel exhibits improved cloud point compared to the cloud point of the pre-blend of fossil diesel fuel and HVO renewable diesel fuel. Additionally, the blend has improved oxidation stability and cetane number compared to oxidation stability and cetane number of the pre-blend.

Example 6

The diesel fuel component 5 was blended with typical fossil diesel product as explained in Example 4 and with FAME (fatty acid methyl esters). A pre-blend (FAME diesel B7) was made according to specification EN 14214, containing 7 vol-% FAME (fatty acid methyl ester) in 93 vol-% fossil diesel. This pre-blend was then mixed with 25 and 50 vol-% of the diesel component 5.

Table 10 presents the properties of the blends comprising diesel fuel component 5 in comparison to the pre-blend and diesel fuel component 5.

TABLE 10

|  | Pre-blend | Pre-blend 75 vol-% + diesel fuel component 5 25 vol-% | Pre-blend 50 vol-% + diesel fuel component 5 50 vol-% | Diesel fuel component 5 |
|---|---|---|---|---|
| Cloud point (° C.) ASTM D7689 | −4.8 | −6.2 | −9.8 | −33.2 |
| Oxidation stability (min) ASTM EN16091 | 101.06 | 111.67 | 128.33 | 63.38 |
| Cetane number IQT, ASTM D6890 | 52.0 | 58.8 | 65.4 | 82.6 |

The blends containing diesel fuel component 5 exhibit improved cloud points compared to the cloud point of the FAME diesel B7. Additionally, the blends have improved oxidation stability and cetane number compared to oxidation stability and cetane number of the FAME diesel B7.

Example 7

The diesel fuel component 5 was further blended with a pre-blend containing typical fossil diesel, HVO renewable diesel and FAME. In this experiment a pre-blend was made containing fossil diesel fuel 68 vol-% and HVO renewable diesel 25 vol-% and FAME diesel B7 7 vol-%. This pre-blend was mixed with 25 and 50 vol-% of the diesel fuel component 5. Table 11 presents the properties of the blends containing the diesel fuel component 5.

TABLE 11

| | Pre-blend | Pre-blend 75 vol-% + diesel fuel component 5 25 vol-% | Pre-blend 50 vol-% + diesel fuel component 5 50 vol-% | Diesel fuel component 5 |
|---|---|---|---|---|
| Cloud point (° C.) D7689 | −6.4 | −8.7 | −12.6 | −33.2 |
| Oxidation stability (min) EN16091 | 96.03 | 105.44 | 112.22 | 63.38 |
| Cetane number IQT D6890 | 60.0 | 64.6 | 70.0 | 82.6 |

The blends containing diesel fuel component 5 exhibit improved cloud point compared to the cloud point of the pre-blend. Additionally, the blends have improved oxidation stability and cetane number compared to oxidation stability and cetane number of the pre-blend.

The invention claimed is:

1. A method for combined production of aviation fuel and diesel fuel both of biological origin, the method comprising:
   providing feedstock of biological origin containing fatty acids and/or esters of fatty acids; and
   subjecting the feedstock to hydrotreatment and isomerization to obtain a paraffinic hydrocarbon intermediate; and
   fractionating said paraffinic hydrocarbon intermediate into at least two fractions,
   a lighter fraction fulfilling a specification ASTM D7566-20 Annex A2 for aviation fuel, and
   a heavier fraction fulfilling a specification EN 15940-18 for renewable diesel fuel; and
   adjusting a production capacity of the lighter fraction and a production capacity of the heavier fraction by selection of hydrotreatment process conditions, and/or the isomerization process conditions, wherein yield of the lighter fraction is from 20 to 90 wt-% of a total weight of the formed fractions, and yield of the heavier fraction is from 10 to 80 wt-% of a total weight of the formed fraction;
   wherein a combined yield of the two fractions is at least 98 wt-% of the paraffinic hydrocarbon intermediate of biological origin.

2. The method according to claim 1, comprising:
   performing the hydrotreatment, and/or a hydrodeoxygenation under a hydrogen pressure from 10 to 150 bar, and/or 20-120 bar, and/or 30-100 bar, and at a temperature from 200 to 400° C., and/or 250-380° C., and/or 280-360° C.

3. The method according to claim 1, comprising:
   performing the hydrotreatment in a presence of one or more catalyst(s) selected from hydrogenation metal on a support, and/or a catalyst selected from a group consisting of Pd, Pt, Ni, Co, Mo, Ru, Rh, W and/or any combination thereof, and/or a catalyst containing one or more catalyst(s) selected from CoMo, NiMo, NiW, CoNiMo on a support, and/or an alumina support.

4. The method according to claim 1, comprising:
   performing the isomerization, and/or hydroisomerization, at a temperature of 200-500° C., and/or 280-370° C., and at a pressure of 10-150 bar, and/or 20-50 bar.

5. The method according to claim 1, comprising:
   performing the isomerization in a presence of one or more catalyst(s) containing a Group VIII metal on a support, where the support is selected from silica, alumina, clays, titanium oxide, boron oxide, zirconia, which can be used alone or as a mixture, and/or as silica and/or alumina.

6. The method according to claim 1, comprising:
   subjecting the feedstock, after hydrotreatment and isomerization, to stabilization at a pressure lower than the isomerization pressure.

7. The method according to claim 6, comprising:
   forming, during stabilization, an overhead fraction containing hydrocarbons in a naphtha range (C4-C8); and
   recycling an amount of 60 wt-% or more, and/or 90 wt-% or more, and/or from 90 to 95 wt-%, of the formed hydrocarbons in the naphtha range at a stabilization column overhead back to the stabilization.

8. The diesel fuel component produced by the method according to claim 1.

* * * * *